(12) United States Patent
Sand

(10) Patent No.: US 6,401,581 B1
(45) Date of Patent: *Jun. 11, 2002

(54) ARRANGEMENT FOR FEEDING OUT FIBRE BUNDLES WITH RANDOM FIBRE DIRECTION

(75) Inventor: Kjell Sand, Västra Frölunda (SE)

(73) Assignee: Aplicator System AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/648,077

(22) PCT Filed: Nov. 16, 1994

(86) PCT No.: PCT/SE94/01080

§ 371 (c)(1),
(2), (4) Date: May 17, 1996

(87) PCT Pub. No.: WO95/13992

PCT Pub. Date: May 26, 1995

(30) Foreign Application Priority Data

Nov. 19, 1993 (SE) ................................................ 9303837

(51) Int. Cl.[7] ............................. D01G 1/04; B26D 7/14; B26D 7/18
(52) U.S. Cl. ................................ 83/99; 83/100; 83/175; 83/346; 83/913; 241/60
(58) Field of Search ............................ 83/18, 100, 175, 83/346, 347, 24, 37, 98, 99, 343, 913, 950; 65/452, 536, 453; 241/60; 19/60, 62

(56) References Cited

U.S. PATENT DOCUMENTS

| | | | | |
|---|---|---|---|---|
| 2,702,261 A | * | 2/1955 | Bacon et al. | 83/347 X |
| 2,981,134 A | * | 4/1961 | Johnson | 83/18 |
| 3,334,532 A | * | 8/1967 | Mylo | 83/175 X |
| 3,730,411 A | * | 5/1973 | Brockmuller | 83/175 X |
| 3,763,561 A | * | 10/1973 | Scharfenberger | 83/347 X |
| 3,869,268 A | * | 3/1975 | Briar et al. | 83/347 X |
| 4,191,079 A | * | 3/1980 | Symborski | 83/347 |
| 4,369,681 A | * | 1/1983 | Van Doorn et al. | 83/100 |
| 4,406,196 A | * | 9/1983 | Roncato et al. | 83/347 X |
| 4,411,180 A | * | 10/1983 | Roncato | 83/347 X |
| 4,637,286 A | * | 1/1987 | Boggs | 83/347 X |
| 4,938,907 A | * | 7/1990 | Vowles et al. | 83/175 X |

FOREIGN PATENT DOCUMENTS

FR 1257352 2/1961

* cited by examiner

Primary Examiner—Clark F. Dexter
(74) Attorney, Agent, or Firm—Ostrolenk, Faber, Gerb & Soffen, LLP

(57) ABSTRACT

An arrangement for repeatedly feeding fiber bundles with random fiber direction from a magazine roll of fiber thread, for example in the production of flock preforms for products made of thermosetting resin. The arrangement comprises feed devices for feeding the fiber threads from the magazine roll and cutting device for cutting the fibers into the desired lengths. The feed devices include at least a first and a second pair of driven feed rollers placed in sequence, which feed rollers form nips for the fiber threads. A pneumatically driven fiber-ejecting device is placed downstream of the cutting devices. The fiber ejection device includes an oblong tube sleeve with air flow channels for directing turbulent air flow.

5 Claims, 1 Drawing Sheet

ARRANGEMENT FOR FEEDING OUT FIBRE BUNDLES WITH RANDOM FIBRE DIRECTION

TECHNICAL FIELD

The present invention concerns an arrangement for repeatedly feeding out fiber bundles with random fiber direction from a magazine roll of fiber thread, for example in the production of flock preforms for products made of thermosetting resin. The arrangement comprises feed devices for feeding the fiber threads from the magazine roll and cutting devices for cutting, the fiber into desired lengths. The feed devices comprise at least a first and a second pair of driven feed rollers placed in sequence, which feed rollers form nips for the fiber threads, and a pneumatically driven fiber-ejecting device placed downstream of the cutting device.

BACKGROUND OF THE INVENTION

The production of fiber reinforced thermosetting resin products is difficult to automate since the quality of the product depends to a great extent on how the fibers are oriented with respect to how the product will be subjected to loading. Modern quality standards usually require a product to have an exact quantity of fibers that are oriented to obtain maximum strength without the fibers penetrating the product's outer plastic layer.

It is customary to use very thin fibers, known as surfacing mat fibers in the outer fiber layer. This prevents the more robust fibers of normal thickness from penetrating the outer plastic layer of the thermosetting resin product. Such penetration would otherwise lead to the product having to undergo a costly manual after-treatment.

TECHNICAL PROBLEM

The aim of the present invention, is to produce an arrangement for feeding out thin fiber bundles, which bundles can be used as surfacing mat layers in the manufacture of thermosetting products, and which arrangement makes it possible to automate the addition of reinforcing fiber to a product, for example by using an industrial robot, so that flock preforms can be repeatably produced.

THE SOLUTION

For this purpose the invention is characterized in that the first pair of feed rollers is driven at slightly lower feeding speed than the second pair of feed rollers, and that the fiber ejection devices include an oblong tube sleeve with air flow channels for directed turbulent air flow.

DESCRIPTION OF THE DRAWING

The invention will be described below with reference to a given embodiment, which is shown in the attached drawing. The drawing is a schematic representation showing a side view of the arrangement according to the invention.

DESCRIPTION OF THE GIVEN EMBODIMENT

Figure 1:
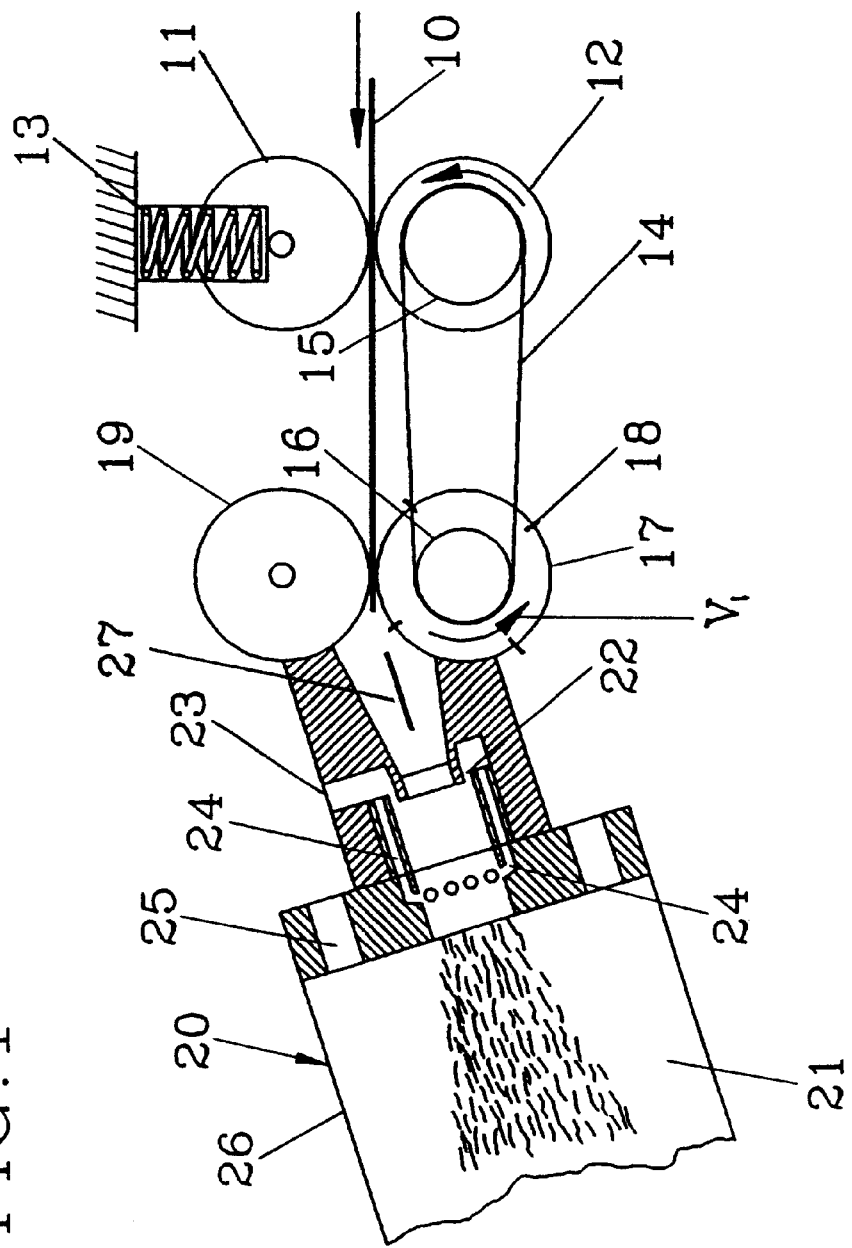

In the arrangement shown in the, drawing a continuous multiple- and fine-threaded glass fiber 10 is fed from right to left into the nip between two rollers 11, 12 from a magazine roll (not shown). The roller 11 is displaceably journalled and is pressed towards the other roller 12 by the action of a compression spring 13. The roller 12 is driven via a toothed belt 14, which runs round the two toothed gears 15 and 16.

The gear wheel 15 is connected to the roller 12, while the other gear wheel 16 is connected to a knife roller 17, which is provided with four knife blades 18 directed to extend along its periphery. The blades are spaced evenly along the circumference of the roller 17. Rubber cylinder 19 is in contact with the roller 17 to act as an anvil roller to roller 17 and against the knives 18.

The roller 17 can be driven at variable speeds with a rotational speed $V_1$ by a driving motor (not shown). The speed adjustment can preferably be carried out with the help of pulse-counting devices. As the gear wheel 15 is somewhat larger than the gear wheel 16, it is driven at a slightly lower speed $V_2$ than the gear wheel 16.

As a result of this difference in speed, of the gear wheels a stretching of the individual fiber in the fiber bundle of the thread 10 is achieved, so that the bundle is flattened out transversely in the nip between the roller 17 and the cylinder 19.

A fiber feeding head 20 is placed downstream of the pair of rollers 17, 19 and is equipped with a closed passage 27 and with a central passage 21 for the severed fiber bundle. A annular slit 22 is arranged concentrically around an end of the central passage 21 and is connected via a channel 23 to an air pressure source. A number of secondary channels 24 are connected with the channel 23 and open out downstream of the slit 22.

The compressed air that is forced into the fiber feeding head 20 via the channel 23, the slit 22 and the secondary channels 24 brings ambient air via the closed passage 27. Moreover, additional air is injected into tube sleeve 26 via a number of concentrically arranged air openings 25. As a result of the achieved blowing effect, the fiber bundles severed from the thread 10 by the knives 18 will be subjected to a turbulent air flow causing them to be bent and scattered in all directions to form a "woolly tuft" when they come into contact with the inner wall of an oblong tube sleeve 26, which forms an extension of the fiber feeding head 20.

The arrangement described above should preferably be mounted on a robot arm (not shown), which is freely moveable in space and is controlled by a programmable microprocessor.

The invention is not limited to the embodiments described above. Further variations are conceivable within the scope of the following claims.

What is claimed is:

1. Apparatus for repeated feeding of fiber bundles with random fiber direction from a magazine roll of fiber thread, the apparatus comprising:

feed means for feeding a continuous fiber thread and comprising:
       a first roller over which the fiber thread is guided, followed by
       a second roller over which the fiber thread is guided;
   a cutting device at the second roller for cutting the fiber thread into cut lengths for transmittal beyond the second roller; and
   a pneumatically driven, fiber ejecting device following the cutting device for receiving the cut lengths of fiber thread from a the cutting device, the ejecting device including:
       a tube for conveying the cut lengths of fiber thread; and further including
       air flow channels in the ejecting device for directing a turbulent air flow into the tube and over the cut lengths of fiber thread, a central passage into the tube for receiving the cut lengths,
an annular slit around the central passage,
a plurality of secondary channels into the central passage for airflow thereto, and
air openings into the tube for entry of air therein.

2. The apparatus of claim 1, wherein the cutting device is supported on the second roller such that rotation of the second roller moves the cutting device to cut the fiber thread into the cut lengths.

3. The apparatus of claim 1 wherein the first roller rotates at a slightly slower feeding speed than the second roller for pulling on the fiber thread as it is fed from the first to the second roller.

4. An apparatus for repeated feeding of fiber bundles with random fiber direction from a magazine roll of fiber thread, the apparatus comprising:

feed means for feeding a continuous fiber thread and comprising:
a first pair of rollers forming a first nip through which the fiber thread is guided, followed by
a second pair of rollers forming a second nip through which the fiber thread is guided;
a cutting device at the feed means for cutting the fiber thread into cut lengths for being transmitted beyond the second pair of rollers; and
a pneumatically driven, fiber ejecting device following the cutting device for receiving the cut lengths of fiber thread from the cutting device, the ejecting device including:
a tube for conveying the cut lengths of fiber thread,
air flow channels in the ejecting device for directing a turbulent air flow into the tube and over the cut lengths of fiber thread,
a closed passage leading from the cutting device to a central passage and the central passage leading to the tube, at least one of the air flow channels communicating with an outlet from the closed passage into the central passage for applying air flow to the cut lengths of fiber as they exit the closed passage and for assisting the movement of the cut lengths of fiber through the central passage, and
at least one secondary air channel feeding into the central passage downstream of the outlet for supplying further air flow to the cut lengths of fiber moving through the ejecting device.

5. The apparatus of claim 4, further comprising air openings into the tube of the ejecting device which are open to ambient air.

\* \* \* \* \*